(12) United States Patent
Kong et al.

(10) Patent No.: US 11,400,586 B2
(45) Date of Patent: Aug. 2, 2022

(54) AUTOMATIC WALKING ROBOT AND BELT DRIVE SYSTEM

(71) Applicant: Suzhou Cleva Precision Machinery & Technology Co., Ltd., Suzhou (CN)

(72) Inventors: Zhao Kong, Suzhou (CN); Kui Han, Suzhou (CN)

(73) Assignee: Suzhou Cleva Precision Machinery and Technology Co., Ltd, Suzhou (CN)

( * ) Notice: Subject to any disclaimer, the term of this patent is extended or adjusted under 35 U.S.C. 154(b) by 345 days.

(21) Appl. No.: 16/649,792

(22) PCT Filed: Sep. 26, 2018

(86) PCT No.: PCT/CN2018/107468
§ 371 (c)(1),
(2) Date: Mar. 23, 2020

(87) PCT Pub. No.: WO2019/062735
PCT Pub. Date: Apr. 4, 2019

(65) Prior Publication Data
US 2020/0306956 A1    Oct. 1, 2020

(30) Foreign Application Priority Data

Sep. 26, 2017   (CN) .......................... 201710882529.4

(51) Int. Cl.
*B25J 9/00*    (2006.01)
*B25J 9/10*    (2006.01)
(Continued)

(52) U.S. Cl.
CPC ............. *B25J 9/1045* (2013.01); *B25J 5/007* (2013.01); *B25J 5/02* (2013.01)

(58) Field of Classification Search
CPC . B25J 9/1045; B25J 5/007; B25J 5/02; A01D 34/008; A01D 69/06; F16H 2007/0865; F16H 7/08
See application file for complete search history.

(56) References Cited

U.S. PATENT DOCUMENTS

2013/0109343 A1    5/2013  Cheng et al.
2022/0016901 A1*   1/2022  Liao ........................... B41J 2/32
2022/0105739 A1*   4/2022  Silbert ............. G01N 35/00732

FOREIGN PATENT DOCUMENTS

CN    102308121 A    1/2012
CN    104115611 A    10/2014
(Continued)

OTHER PUBLICATIONS

International Search Report for Application No. PCT/CN2018/107468, dated Jan. 7, 2019.

*Primary Examiner* — Ian Jen
(74) *Attorney, Agent, or Firm* — JK Intellectual Property Law, PA (57) ABSTRACT

A belt drive system includes a driving wheel, a driven wheel and a drive belt. A first and a second drive belt tensioning mechanism are included. When a first drive member rotates, it moves relative to a first mounting seat and along an axial direction of the first drive member to drive the first tensioning device to move relative to the housing. When a second drive member rotates, it drives the second tensioning device to move relative to the second mounting seat. A related automatic walking robot includes a housing, a road wheel set rotatably arranged on the housing, and a walking motor arranged on the housing for driving the road wheel set.

13 Claims, 4 Drawing Sheets

(51) Int. Cl.
*B25J 5/00* (2006.01)
*B25J 5/02* (2006.01)

(56) References Cited

FOREIGN PATENT DOCUMENTS

| | | |
|---|---|---|
| CN | 106523631 A | 3/2017 |
| CN | 107548713 A | 1/2018 |
| JP | 57190154 A | 11/1982 |

\* cited by examiner

AUTOMATIC WALKING ROBOT AND BELT DRIVE SYSTEM

CROSS-REFERENCE TO RELATED PATENT APPLICATIONS

This application is a national stage of International Application No. PCT/CN2018/107468, filed on Sep. 26, 2018 which claims priority to CN Patent Application No. 201710882529.4, filed on Sep. 26, 2017. All of the aforementioned applications are hereby incorporated by reference in their entireties.

TECHNICAL FIELD

The present disclosure relates to an automatic walking robot and a belt drive system.

BACKGROUND

With the development of science and technology, smart automatic walking equipment has been widely applied, such as mowers, dust collectors and the like among household products, and can automatically execute preset related tasks by using preset programs without manual operation and intervention, so that the smart equipment greatly saves time of people and brings great convenience to household life. Compared with the traditional product, the automatic walking robot has the automatic walking function, can prevent collision, prevent going beyond a certain range, automatically return to charge and the like, has certain climbing capacity, and is particularly suitable for trimming and maintaining lawns in places such as family courtyards and public greenbelts. The automatic walking robot can finish the work of trimming the lawn autonomously without manual direct control and operation, has low power, low noise and no pollution, and greatly reduces the manual operation.

When the automatic walking mowing robot walks, the driving wheel and the driven wheel must keep synchronous movement, otherwise, the automatic walking mowing robot will deflect when walking, thereby affecting walking precision. Thus it is necessary that the synchronous belt must be tensioned sufficiently to allow the two wheels to achieve synchronous motion. In addition, when the mowing robot moves forwards and backwards and then turns in the walking process, the driving wheel still rotate forwards and backwards correspondingly, therefore the synchronous belt is required to be tensioned on two sides. Currently, synchronous belt tensioning technologies adopted by the mowing robot include center distance-adjustable tensioning and tension wheel tensioning; because the center distance of the wheel shaft of the mowing robot is fixed, only the tension wheel tensioning can be used. Generally, the tension wheel presses the synchronous belt by the elastic force of the spring, not only the structure is complicated, but also the tightness of the synchronous belt is inconvenient to adjust because the pressing force of the spring is fixed.

SUMMARY

The object of the present disclosure is to provide an automatic walking robot and a belt drive system, wherein a first drive belt tensioning mechanism thereof has a simple structure, is convenient to operate and has a better tensioning effect.

In order to achieve one of the above objects, an embodiment of the present disclosure provides an automatic walking robot for automatically walking and working on the ground, the robot comprises a housing, a road wheel set rotatably arranged on the housing and a walking motor for driving the road wheel set, wherein along the traveling direction of the automatic walking robot, the road wheel set comprises two front wheels arranged in front and two rear wheels arranged oppositely; a belt drive system is provided between the front wheel and the rear wheel which are located on the same side of the housing, and the belt drive system comprises a driving wheel, a driven wheel and a drive belt arranged on the peripheries of the driving wheel and the driven wheel to transmit motion; the axis line of the driving wheel and the axis line of the driven wheel define a plane, and the drive belt comprises a first side portion located on one side of the plane and a second side portion located on the other side of the plane; the automatic walking robot further comprises a first drive belt tensioning mechanism acting on the first side portion and a second drive belt tensioning mechanism acting on the second side portion, the first drive belt tensioning mechanism comprises a first mounting seat fixed on the housing, a first drive member threadedly connected to the first mounting seat, and a first tensioning device movably arranged on the housing and abutted against the first side portion, wherein the first drive member is abutted against the first tensioning device, and when the first drive member is operated to rotate relative to the first mounting seat, the first drive member moves relative to the first mounting seat and along the axis direction of the first drive member to drive the first tensioning device to move relative to the housing; the second drive belt tensioning mechanism comprises a second mounting seat fixedly arranged on the housing, a second drive member in clearance fit with the second mounting seat, and a second tensioning device movably arranged on the housing and abutted against the second side portion, wherein the second drive member is threadedly connected to the second tensioning device, and when the second drive member is operated to rotate relative to the second mounting seat, the second drive member will rotate relative to the second tensioning device to drive the second tensioning device to move relative to the housing; and the first drive member and the second drive member are located on the same side of the plane.

As a further improvement of the embodiment of the present disclosure, the first drive member and the second drive member are both located on the side of the drive belt, the side being farther from the walking ground surface of the automatic walking robot.

As a further improvement of the embodiment of the present disclosure, the first tensioning device comprises a first bracket abutting against the first drive member and a first roller rotatably arranged on the first bracket, and the first roller is abutted against the drive belt.

As a further improvement of the embodiment of the present disclosure, the first mounting seat and the first roller are both located on the periphery of the drive belt and on the same side of the plane.

As a further improvement of the embodiment of the present disclosure, the first bracket includes a first side portion, a second side portion opposite to the first side portion, and a bottom portion connecting the first side portion and the second side portion, wherein the first side portion and the second side portion are located on the same side of the bottom portion and constitute an opening portion, the first roller is arranged between the first side portion and the second side portion, and the drive belt is at least partially located in the opening portion.

As a further improvement of the embodiment of the present disclosure, the housing is provided with a first guiding rail fittingly connected to the first bracket, and the first guiding rail ensures that the first bracket drives the first roller to move linearly when the first drive member is rotated.

As a further improvement of the embodiment of the present disclosure, the first tensioning device and second tensioning device move in opposite directions when the first drive member and the second drive member are rotated in the same direction, and the first tensioning device and second tensioning device move in the same direction when the first drive member and the second drive member are rotated in opposite directions.

As a further improvement of the embodiment of the present disclosure, the second tensioning device comprises a second bracket threadedly connected to the second drive member and a second roller rotatably arranged on the second bracket, and the second roller is abutted against the drive belt.

As a further improvement of the embodiment of the present disclosure, the second mounting seat and the second roller are both located on the periphery of the drive belt and are respectively located on two sides of the plane.

As a further improvement of the embodiment of the present disclosure, the first roller and the second roller are both located on the periphery of the drive belt and are respectively located on two sides of the plane.

As a further improvement of the embodiment of the present disclosure, the bracket includes a left side wall, a right side wall opposite to the left side wall and a bottom wall connecting the left side wall and the right side wall, wherein the left side wall and the right side wall are located on the same side of the bottom wall, the second drive member is threadedly connected to the bottom wall, the second roller is located between the left side wall and the right side wall, and the left side wall, the right side wall, the bottom wall, and the second roller constitute a closed cavity, and the drive belt penetrates through the closed cavity.

As a further improvement of the embodiment of the present disclosure, the housing is provided with a second guiding rail fittingly connected to the second bracket, and the second guiding rail ensures that the second bracket drives the second roller to move linearly when the second drive member is rotated.

To achieve one of the above objects, according to one embodiment of the present disclosure, a belt drive system comprises a driving wheel, a driven wheel and a drive belt which is arranged on the peripheries of the driving wheel and the driven wheel to transmit motion, wherein the axis line of the driving wheel and the axis line of the driven wheel define a plane, and the drive belt comprises a first side portion located on one side of the plane and a second side portion located on the other side of the plane, the belt drive system further comprises a first drive belt tensioning mechanism acting on the first side portion and a second drive belt tensioning mechanism acting on the second side portion, the first drive belt tensioning mechanism comprises a first mounting seat, a first drive member threadedly connected to the first mounting seat, and a first tensioning device abutted against the first side portion, wherein the first drive member is abutted against the first tensioning device, and when the first drive member is operated to rotate relative to the first mounting seat, the first drive member moves relative to the first mounting seat and along the axis direction of the first drive member to drive the first tensioning device to move relative to the housing; the second drive belt tensioning mechanism comprises a second mounting seat, a second drive member in clearance fit with the second mounting seat, and a second tensioning device abutted against the second side portion, wherein the second drive member is threadedly connected to the second tensioning device, and when the second drive member is operated to rotate relative to the second mounting seat, the second drive member will rotate relative to the second tensioning device to drive the second tensioning device to move relative to the second mounting seat; and the first drive member and the second drive member are located on the same side of the plane.

Compared with the prior art, the beneficial effect of the present disclosure is that: the rotation direction of the automatic walking robot will be changed frequently, for example, the automatic walking robot walks forwards and backwards, so the tight edge and the loose edge of the drive belt need to be converted to each other. In the present disclosure, the two side portions of the drive belt are respectively provided with the first drive belt tensioning mechanism and the second drive belt tensioning mechanism, and the first drive member and/or the second drive member can be rotated as required, thereby tensioning the first side portion and/or the second side portion of the drive belt, having better tensioning effect. In addition, since the first drive member and the second drive member are located on the same side of the plane and on the side of the drive belt, the side being farther from the housing, so that the first drive member and the second drive member are both easily accessible. When the first drive belt tensioning mechanism and/or the second drive belt tensioning mechanism are adjusted, the tensioning adjustment on both side portions can be performed by only rotating the first drive member and/or the second drive member, making the operation very convenient. In conclusion, the drive belt tensioning operation provided by the present embodiment is convenient and has a better tensioning effect.

DETAILED DESCRIPTION

The present disclosure will be described in detail below with reference to specific embodiments shown in the accompanying drawings. However, these embodiments are not intended to limit the present disclosure, and structural, methodological, or functional changes made by those skilled in the art based on these embodiments are intended to be included within the scope of protection of the present disclosure.

In the various figures of the present application, certain dimensions of structures or portions may be exaggerated relative to other structures or portions for convenience of illustration, and thus, the figures are used only to illustrate the basic structure of the subject matter of the present application.

In addition, terms such as "upper", "above", "lower", "below" and the like used herein to indicate a spatially relative position are used for the ease of explanation to describe the relationship of one unit or feature with respect to another unit or feature as illustrated in the figures. Terms of the spatially relative position may be intended to encompass different orientations of the device in use or operation in addition to the orientation depicted in the figures. For example, if the device in the figures is turned over, units described as "below" or "beneath" other units or features would then be oriented "above" the other units or features. Thus, the exemplary term "below" may encompass both an orientation of above and below. The device may be otherwise oriented (rotated by 90 degrees or other orientations) and the spatially-relative descriptors used herein are interpreted accordingly.

Moreover, it will be understood that, although the terms first, second, etc. may be used herein to describe various elements or structures, these described objects should not be limited by the terms above. The above terms are only used to distinguish these described objects from each other. For example, the first drive belt tensioning mechanism may be referred to as the second drive belt tensioning mechanism, and likewise, the second drive belt tensioning mechanism may be referred to as the first drive belt tensioning mechanism, without departing from the scope of protection of protection of this application.

Referring to FIGS. 1 to 8, the specific embodiment of the present disclosure discloses an automatic walking robot, preferably a mowing robot, which is used for automatically walking and working on the ground, wherein the walking and working energy is provided by a battery. The mowing robot includes a housing 10, a road wheel set rotatably provided on the housing 10, and a walking motor (not shown) that drives the road wheel set. The mowing robot further includes a working module mounted in the housing 10 for mowing a lawn, wherein the working module includes a cutting motor, a transmission shaft connected to the cutting motor, and a cutting device (not shown) connected to the transmission shaft, and the cutting device may be a cutting member capable of mowing the lawn, such as a cutting blade, a cutting line, or the like. In addition, the mowing robot further comprises a control module used for coordinating the working module and the road wheel set, and the control module can enable the mowing robot to automatically walk on the lawn and mow under the unattended condition. In the description of the present disclosure, unless otherwise specified, directional terms such as front, rear, left, right, up, down, and the like are referred to with reference to the direction in which the mowing robot normally travels forward.

In the present embodiment, the road wheel set includes four road wheels 12a, 12b, 14a, 14b, which respectively are front road wheels 12a, 12b arranged at two sides of the front portion of the housing 10 and rear road wheels 14a, 14b oppositely arranged at two sides of the rear portion of the housing 10, wherein each road wheel has a mutually independent wheel axle, and the front road wheels 12a, 12b and the rear road wheels 14a, 14b at two sides of the housing 10 are respectively arranged symmetrically to each other. The front road wheels 12a, 12b and the rear road wheels 14a, 14b are defined based on the traveling direction along the automatic walking robot.

Next, the left front road wheel 12a and the left rear road wheel 14a will be described in detail as an example, and a belt drive system is provided between the left front road wheel 12a and the left rear road wheel 14a, and the belt drive system may be directly connected to the left front road wheel 12a, and of course, other mechanisms may be provided between the belt drive system and the left front road wheel 12a, so that the belt drive system is indirectly connected to the left front road wheel 12a as long as the motion can be transmitted to the left front road wheel 12a. Likewise, the belt drive system may be directly connected to the left rear road wheel 14a, and of course, other mechanisms may be provided between the belt drive system and the left rear road wheel 14a, so that the belt drive system is indirectly connected to the left rear road wheel 14a, as long as the motion is transmitted to the left rear road wheel 14a.

Specifically, the belt drive system includes a driving wheel 16, a driven wheel 18, and a drive belt 19 which is arranged on the peripheries of the driving wheel 16 and the driven wheel 18 to transmit motion. In the present preferred embodiment, the driving wheel 16 is connected to the front left road wheel 12a, and the driven wheel 18 is connected to the rear left road wheel 14a. The left front road wheel 12a and the left rear road wheel 14a are driven by the drive belt 19, so that the synchronous rotation of the left front road wheel 12a and the left rear road wheel 14a is achieved. The right side road wheels can implement synchronous rotation of the right front road wheel 12b and the right rear road wheel 14b through another belt drive system, and the specific structure is similar to that of the left side road wheels, and is not described in detail here. In the present embodiment, the drive belt 19 is a synchronous belt, and the transmission from the left rear road wheel 14a to the left front road wheel 12a can be summarized as follows: the driving wheel 16 drives the driven wheel 18 through the synchronous belt, the driving wheel 16 and the driven wheel 18 rotate/stop synchronously, and the rotation speed and the rotation direction are the same. The transmission on right side is similar to that on the left side and will not be described again here.

Further, the mowing robot further comprises a first drive belt tensioning mechanism 20 for tensioning the drive belt 19, wherein the first drive belt tensioning mechanism 20 comprises a first mounting seat 22 fixedly arranged on the housing 10, a first drive member 24 arranged on the first mounting seat 22, and a first tensioning device 26 movably arranged on the housing 10 and abutting against the drive belt 19. Wherein, the first drive member 24 is operatively rotatable relative to the first mounting seat 22, and when the first drive member 24 rotates relative to the first mounting seat 22, the first tensioning device 26 is driven to move relative to the housing 10 for a certain displacement, thereby tensioning the drive belt 19. Since the first mounting seat 22 is fixedly provided on the housing 10, the first tensioning device 26 moves relative to the first mounting seat 22 to tension the drive belt.

Further, the mower further comprises a second drive belt tensioning mechanism 46 for tensioning the drive belt 19, wherein the second drive belt tensioning mechanism 46 comprises a second mounting seat 48 fixedly arranged on the housing 10, a second drive member 50 in clearance fit with the second mounting seat 48, a second tensioning device 52 movably arranged on the housing 10 and abutting against the drive belt 19, the second drive member 50 is in threaded connection with the second tensioning device 52, wherein the second drive member 50 is operatively rotatable relative to the second mounting seat 48, and when the second drive member 50 rotates relative to the second mounting seat 48, the second tensioning device 52 will rotate relative to the second drive member 50 and move relative to the housing 10 due to the threaded connection between the second drive member 50 and the second tensioning device 52, thereby tensioning the drive belt 19. Likewise, since the second mounting seat 48 is fixedly arranged on the housing 10, the second tensioning device 52 will move relative to the second mounting seat 48 to tension the drive belt.

Moreover, the axis line of the driving wheel 16 and the axis line of the driven wheel 18 define a plane, and the drive belt 19 includes a first side portion located on one side of the plane and a second side portion located on the other side of the plane, wherein the first drive belt tensioning mechanism 20 is used for tensioning the first side portion, and correspondingly, the first tensioning device 26 is abutted against the first side portion; the second drive belt tensioning mechanism 46 is used for tensioning the second side portion, and correspondingly, the second tensioning device 52 is abutted against the second side portion. Specifically, the first drive member 24 and the second drive member 50 are located on the same side of the plane. Specifically, the first drive member 24 and the second drive member 50 are both located on the side of the drive belt 19, the side being farther from the walking ground surface of the mowing robot.

During actual use, the rotation direction of the automatic walking robot will change frequently, for example, the automatic walking robot walks forwards and backwards, so the tight edge and the loose edge of the drive belt 19 need to be converted to each other. In the present disclosure, the two side portions of the drive belt 19 are respectively provided with the first drive belt tensioning mechanism 20 and the second drive belt tensioning mechanism 46, and the first drive member 24 and/or the second drive member 50 can be rotated as required, thereby tensioning the first side portion and/or the second side portion of the drive belt 19, having better tensioning effect. In addition, since the first drive member 24 and the second drive member 50 are located on the same side of the plane and on the side of the drive belt 19, the side being farther from the housing 10, so that the first drive member 24 and the second drive member 50 are both easily accessible. When the first drive belt tensioning mechanism 20 and/or the second drive belt tensioning mechanism 46 are adjusted, the tensioning adjustment on both side portions can be performed by only rotating the first drive member 24 and/or the second drive member 50, making the operation very convenient. In conclusion, the drive belt tensioning operation provided by the present embodiment is convenient and has a better tensioning effect.

Specifically, the first drive member 24 is threadedly connected to the first mounting seat 22, and the first drive member 24 is abutted against the first tensioning device 26. When the first drive member 24 is operated to rotate relative to the first mounting seat 22, the first drive member 24 moves relative to the first mounting seat 22 and along the axial direction of the first drive member 24, thereby causing the first tensioning device 26 to move relative to the housing 10.

The first tensioning device 26 includes a first bracket 28 abutting against the first drive member 24 and a first roller 30 rotatably mounted on the first bracket 28 through a pivot 32, and the first roller 30 is abutted against the drive belt 19. When the first drive member 24 rotates, since the first drive member 24 is threadedly connected to the first mounting seat 22, the first drive member 24 displaces for a certain distance relative to the first mounting seat 22 in the direction of the axis 34 of the first drive member 24 while rotating relative to the first mounting seat 22, and the first drive member 24 pushes the first bracket 28 to move, so that the first bracket 28 drives the first roller 30 to move to tension the drive belt 19.

The first mounting seat 22 and the first roller 30 are both located on the periphery of the drive belt 19 and on the same side of a plane defined by the axis line of the driving wheel 16 and the axis of the driven wheel 18. This facilitates the assembly of the first drive belt tensioning device mechanism 20. In addition, when the first drive member 24 is operated to rotate relative to the first mounting seat 22, the first bracket 28 can be pushed to move the first roller 30 toward the center of the drive belt 19, so as to tension the drive belt 19.

In detail, the first drive member 24 is specifically configured as a first adjusting rod having a first external thread, and the first adjusting rod includes a first rod portion 25 and a first head portion 27 arranged at one end of the first rod portion 25. The first rod portion 25 is provided with a first external thread, and the first mounting seat 22 is provided with a first hole 29 which is provided with a first internal thread. Specifically, the inner diameter of the first hole 29 is adapted to the outer diameter of the first rod portion 27, the first external thread on the first rod portion 25 is intermeshed with the first internal thread in the first hole 29, and the diameter of the first head portion 27 is greater than the diameter of the first hole 29. The end of the first rod portion 25, the end being remote from the first head portion 27, is screwed into and passes through the first hole 29, and then abuts against the first bracket 28.

When the drive belt 19 needs to be tensioned, the first drive member 24 is rotated towards the screwing and tightening direction, and the first drive member 24 moves downwards relative to the first mounting seat 22, so that the first tensioning device 26 is driven to move downwards, and the drive belt 19 is tensioned; when the drive belt 19 needs to be loosened, the first drive member 24 is rotated against the screwing and tightening direction, and conversely, the first drive member 24 moves upwards relative to the first mounting seat 22, and the drive belt 19 can push the first tensioning device 26 upwardly, thereby loosening the drive belt 19.

In the present preferred embodiment, the first tensioning device 26 and the second tensioning device 52 move in opposite directions when the first drive member 24 and the second drive member 50 are rotated in the same direction, and the first tensioning device 26 and the second tensioning device 52 move in the same direction when the first drive member 24 and the second drive member 50 are rotated in opposite directions.

Figure 1:
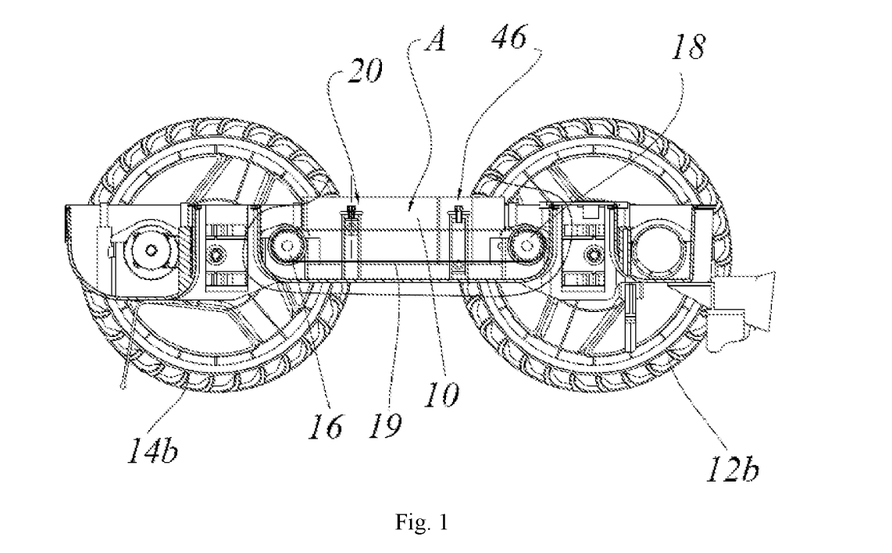
FIG. 1 is a side cross-sectional view of a mowing robot in an embodiment of the present disclosure.
Figure 2:
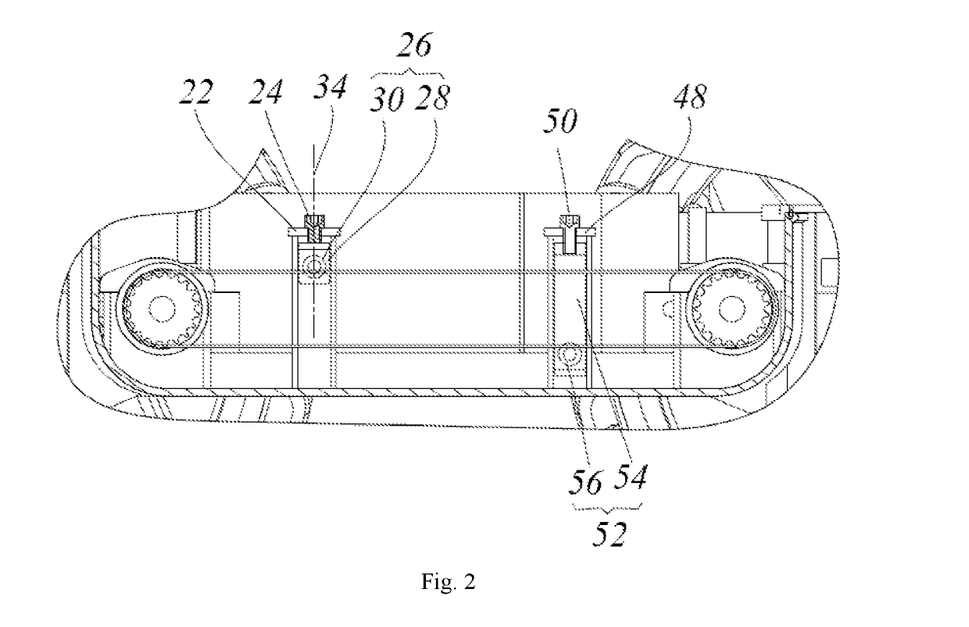
FIG. 2 is an enlarged view of the portion A in FIG. 1.
Figure 3:
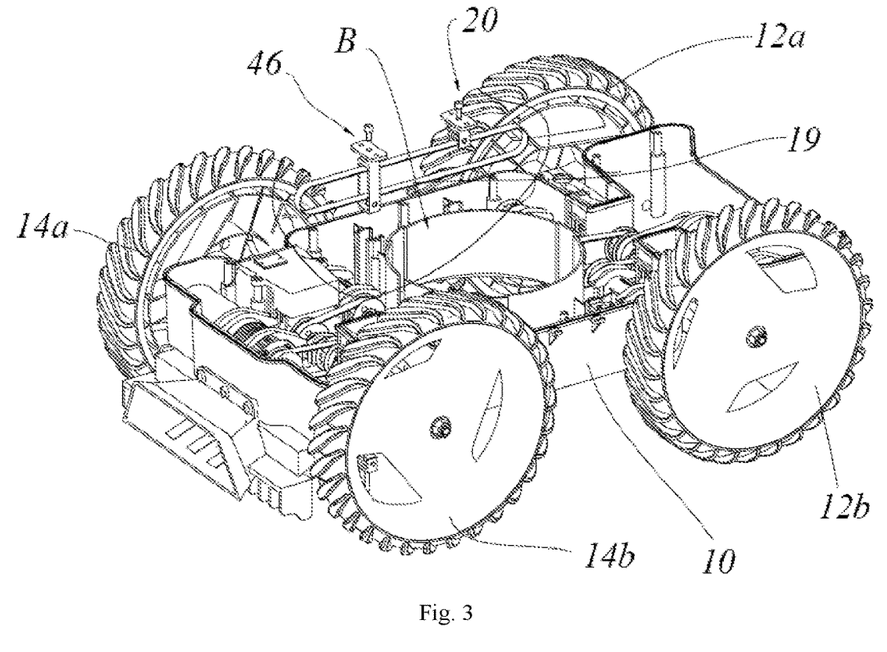
FIG. 3 is a partially-exploded isometric view of a mowing robot in an embodiment of the present disclosure.
Figure 4:
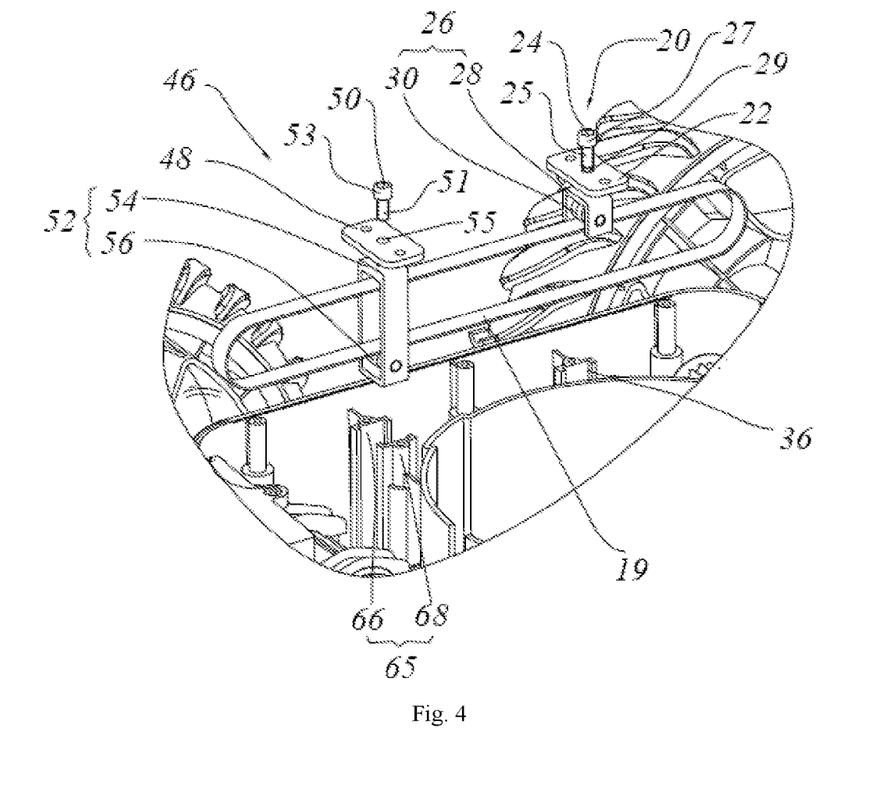
FIG. 4 is an enlarged view of the portion B in FIG. 3.
Figure 5:
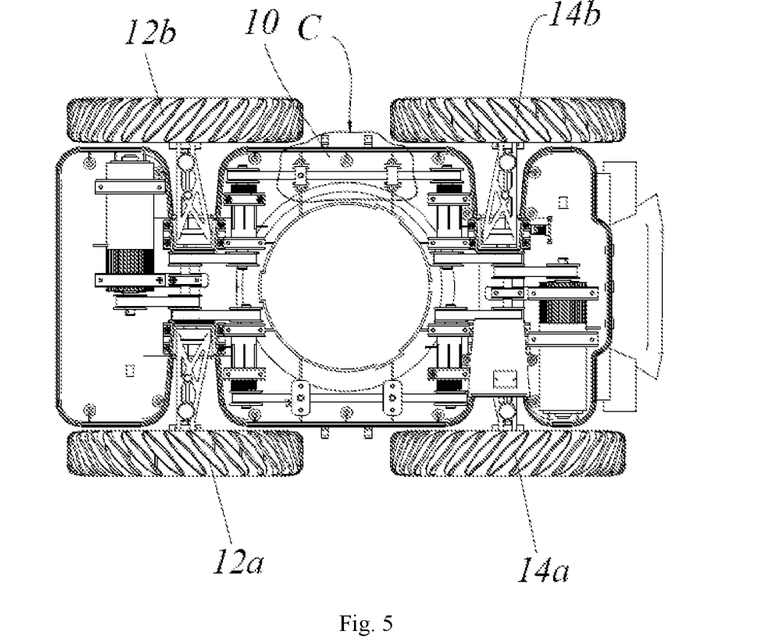
FIG. 5 is a top view of a mowing robot in an embodiment of the present disclosure.
Figure 6:
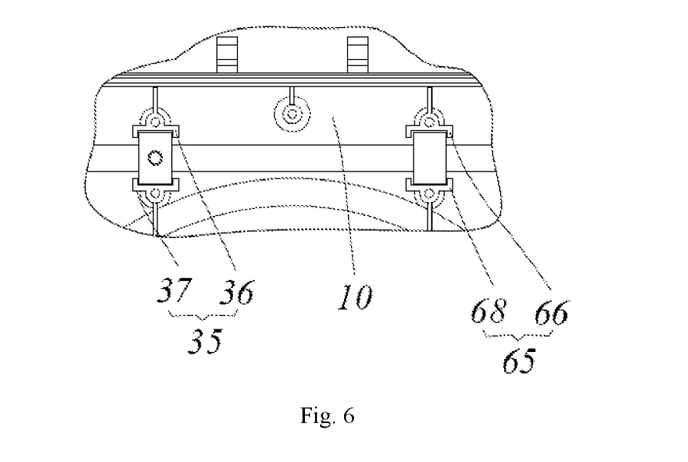
FIG. 6 is an enlarged view of the portion C in FIG. 5.
Figure 7:
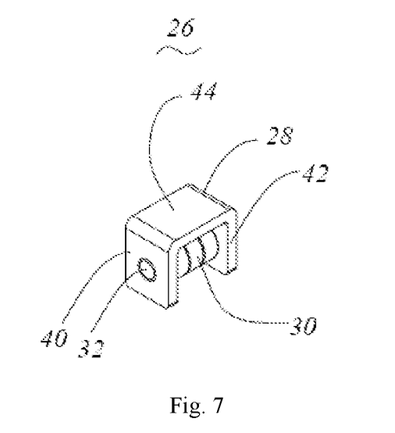
FIG. 7 is an isometric view of a first tensioning device of the mowing robot in FIG. 1.
Figure 8:
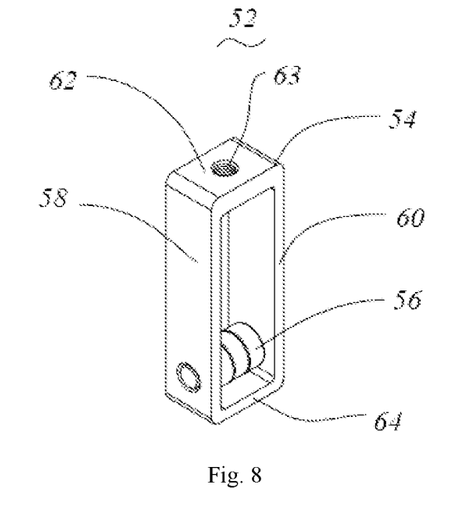
FIG. 8 is an isometric view of a second tensioning device of the mowing robot in FIG. 1.

Referring further to FIGS. 4 to 6, the housing 10 is provided with a first guiding rail 35 fittingly connected to the first bracket 28, and the first guiding rail 35 ensures that the first bracket 28 smoothly moves the first roller 30 in a straight line when the first drive member 24 is rotated. In the present embodiment, the first guiding rail 35 is integrally formed with the housing 10, but the first guiding rail 35 may be connected to the housing 10 by screws or other fixing means. The first guiding rail includes a first rail 36 and a second rail 37 facing the first rail 36, and the first mounting seat 22 is fixedly connected to the first guiding rail 35. Specifically, the first mounting seat 22 is respectively fixed to the first rail 36 and the second rail 37 by two bolts.

Specifically, the cross-section of first rail 36 is generally U-shaped, with the first rail 36 extending upwards from the housing 10. The cross-section of the second rail 37 is also generally U-shaped, with the second rail 37 extending upwards from the housing 10. The U-shaped opening of the first rail 36 faces the U-shaped opening of the second rail 37, the first mounting seat 22 is respectively fixed to the upper end surfaces of the first rail 36 and the second rail 37 by bolts, and the first bracket 28 is located between the first rail 36 and the second rail 37 and in the U-shaped portions of the first rail 36 and the second rail 37. In addition, there is a distance between the first rail 36 and the second rail 37, and the distance allows the drive belt 19 to pass through.

The first bracket 28 includes a first side portion 40, a second side portion 42 opposite to the first side portion 40, and a bottom portion 44 connecting the first side portion 40 and the second side portion 42, wherein the first side portion 40 and the second side portion 42 are located on the same side of the bottom portion 44 and constituting an opening portion, the first roller 30 is arranged between the first side portion 40 and the second side portion 42, and the drive belt 19 is at least partially located in the opening portion. Additionally, the first side portion 40 is at least partially located in the first rail 36 and the second side portion 42 is at least partially located in the second rail.

Further, the second tensioning device 52 includes a second bracket 54 threadedly connected to the second drive member 50 and a second roller 56 rotatably provided on the second bracket 54, and the second roller 56 is abutted against the drive belt 19. When the second drive member 50 is rotated, since the second drive member 50 is threadedly connected to the second bracket 54, the second drive member 50 rotates relative to the second bracket 54 and simultaneously drives the second bracket 54 to move, so that the second bracket 54 drives the second roller 56 to move to tension the drive belt 19.

In the present embodiment, the second mounting seat 48 and the second roller 56 are both located on the periphery of the drive belt 19 and are respectively located on two sides of a plane defined by the axis line of the driving wheel 16 and the axis line of the driven wheel 18. Further, the first roller 30 and the second roller 56 are both located on the periphery of the drive belt 19 and are respectively located on the plane defined by the axis line of the driving wheel 16 and the axis line of the driven wheel 18. Therefore, the two sides of the drive belt 19 can be tensioned, so that the driving wheel 16 can rotate forwards and backwards correspondingly when the mowing robot turns in the process of advancing or retreating. In addition, the first mounting seat 22, the first drive member 24, the second mounting seat 48 and the second drive member 50 are all located on the same side of the drive belt 19, so that the arrangement is convenient not only for mounting, but also for operating to tension the drive belt 19.

The second bracket 54 includes a left side wall 58, a right side wall 60 opposite to the left side wall 58, and a bottom wall 62 connecting the left side wall 58 and the right side wall 60, wherein the left side wall 58 and the right side wall 60 are located on the same side of the bottom wall 62, the second drive member 50 is threadedly connected to the bottom wall 62, the second roller 56 is located between the left side wall 58 and the right side wall 60, and the left side wall 58, the right side wall 60, the bottom wall 62, and the second roller 56 constitute a closed cavity, and the drive belt 19 penetrates through the closed cavity. Further, the bracket further includes a top wall 64 arranged opposite to the bottom wall 62, and the top wall 64 connects the other ends of the left and right side walls 58 and 60. Thus, the left side wall 58, the right side wall 60, the bottom wall 62 and the top wall 64 of the bracket form a cavity with a closed periphery, so that the structure is more stable. The second roller 56 is arranged adjacent the top wall 64, and the second roller 56 and the top wall 64 are on the same side of the drive belt 19.

Further, the second drive member 50 is specifically configured as a second adjusting rod having a second external thread, and the second adjusting rod includes a second rod portion 51 and a second head portion 53 provided at one end of the second rod portion 51. The second rod portion 51 is provided with a second external thread and the second mounting seat 22 is provided with a second hole 55 having a relatively smooth inner surface and an inner diameter slightly larger than the outer diameter of the second rod portion 51 so that the second rod portion 51 can freely pass through second hole 55. The bottom wall 62 is provided with a third hole 63, the third hole 63 is provided with a second internal thread, the inner diameter of the third hole 63 is matched with the outer diameter of the second rod part 51, the second external thread on the second rod part 51 is meshed with the second internal thread in the third hole 63, and the diameter of the second head part 53 is larger than that of the second hole 55. The end of the second rod portion 51, the end being remote from the second head portion 53, is free to pass through the second hole 55 and then is screwed into the third hole 63.

Specifically, when the drive belt 19 needs to be tensioned, the second drive member 50 is rotated in the screwing and tightening direction, the second head portion 53 is always abutted against the second mounting seat 48, that is, the second drive member 50 and the second mounting seat 48 do not move relative to each other in the vertical direction, and the second tensioning device 52 moves upwards relative to the second mounting seat 48, so that the drive belt 19 is tensioned; when the drive belt 19 needs to be loosened, the second drive member 50 is rotated against the screwing and tightening direction, and the second drive member 50 still does not move vertically relative to the second mounting seat 48, while the second drive member 50 drives the second tensioning device 52 to move downwards relative to the second mounting seat 48, so that the drive belt 19 is loosened.

The housing 10 is further provided with a second guiding rail 65 fittingly connected to the second bracket 54, and the second guiding rail 65 ensures that the second bracket 54 smoothly drives the second roller 56 to move in a straight line when the second drive member 50 is rotated. In the present embodiment, the second guiding rail 65 and the housing 10 are integrally formed, and of course, the second guiding rail 65 may also be connected to the housing 10 by screws or other fixing means. The second guiding rail 65 includes a first guiding portion 66 and a second guiding portion 68, the second guiding portion 68 facing the first guiding portion 66, and the first guiding portion 66 and the second guiding portion 68 are spaced apart from each other by a certain distance. The second mounting seat 48 is fixedly connected to the second guiding rail 65, and specifically, the second mounting seat 48 is respectively fixed to the first guiding portion 66 and the second guiding portion 68 by two bolts.

Specifically, the arrangement is similar to that of the first guiding rail 35. The first guiding portion 66 and the second guiding portion 68 are both provided with a substantially U-shape cross section, and both the first guiding portion 66 and the second guiding portion 68 extend upward from the housing 10. The U-shaped opening of the first guiding portion 66 faces the U-shaped opening of the second guiding portion 68, the second mounting seat 48 is respectively fixed to the upper end surfaces of the first guiding portion 66 and the second guiding portion 68 by bolts, and the second bracket 54 is located between the first guiding portion 66 and the second guiding portion 68 and in the U-shaped portions of the first guiding portion 66 and the second guiding portion 68. In addition, there is also a certain distance between the first guiding portion 66 and the second guiding portion 68, and the distance allows the drive belt 19 to pass through.

The left side wall 58 of the second bracket 54 is fittingly connected to the first guiding portion 66, and the right side wall 60 of the second bracket 54 is fittingly connected to the second guiding portion 68, so that when the second drive member 50 is rotated, the second bracket 54 is driven to move linearly along the first guiding portion 66 and the second guiding portion 68.

It should be understood that although the specification has been described in terms of embodiments, not each embodiment contains only one independent technical solution, such recitation is merely for the sake of clarity. Those skilled in the art should take the specification as a whole, and the technical solutions in each embodiment can be properly combined to form additional embodiments that may be appreciated by those skilled in the art.

The above-described series of detailed descriptions are only specific descriptions of feasible embodiments of the present utility model, and they are not intended to limit the scope of protection of the present utility model, and equivalent embodiments or modifications that do not depart from the spirit of the present utility model are intended to be included within the scope of protection of the present utility model.

The invention claimed is:

1. An automatic walking robot for automatically walking and working on the ground, comprising:
   a housing, a road wheel set rotatably arranged on the housing, and a walking motor arranged on the housing for driving the road wheel set;
   the road wheel set including two front wheels and two rear wheels each arranged oppositely to one of the front wheels along a traveling direction;
   a belt drive system located between one of the front wheels and one of the rear wheels located on a same side of the housing, the belt drive system including a driving wheel, a driven wheel, and a drive belt arranged on peripheries of the driving wheel and the driven wheel to transmit motion;
   an axial line of the driving wheel and an axial line of the driven wheel defining a plane, the drive belt having a first side portion located on one side of the plane and a second side portion located on an other side of the plane;
   a first drive belt tensioning mechanism acting on the first side portion and a second drive belt tensioning mechanism acting on the second side portion;
   the first drive belt tensioning mechanism including a first mounting seat fixed on the housing, a first drive member threadedly connected to the first mounting seat, and a first tensioning device movably arranged on the housing and abutted against the first side portion, the first drive member abutting against the first tensioning device, and when the first drive member is operated to rotate relative to the first mounting seat, the first drive member moves relative to the first mounting seat and along the axial direction of the first drive member to drive the first tensioning device to move relative to the housing; and
   the second drive belt tensioning mechanism including a second mounting seat fixed on the housing, a second drive member in clearance fit with the second mounting seat, and a second tensioning device movably arranged on the housing and abutted against the second side portion, the second drive member being threadedly connected to the second tensioning device, and when the second drive member is operated to rotate relative to the second mounting seat, the second drive member rotates relative to the second tensioning device to drive the second tensioning device to move relative to the housing, the first drive member and the second drive member being located on a same side of the plane.

2. The automatic walking robot according to claim 1, wherein the first drive member and the second drive member are both located on a side of the drive belt that is farther from a walking ground surface of the automatic walking robot.

3. The automatic walking robot according to claim 1, wherein the first tensioning device includes a first bracket abutting against the first drive member and a first roller rotatably arranged on the first bracket, the first roller being abutted against the drive belt.

4. The automatic walking robot according to claim 3, wherein the first mounting seat and the first roller are both located on a periphery of the drive belt and on a same side of the plane.

5. The automatic walking robot according to claim 3, wherein the first bracket includes a first side portion, a second side portion opposite to the first side portion, and a bottom portion connecting the first side portion and the second side portion, wherein the first side portion and the second side portion are located on a same side of the bottom portion and constitute an opening portion, the first roller being arranged between the first side portion and the second side portion, the drive belt being at least partially located in the opening portion.

6. The automatic walking robot according to claim 3, wherein the housing includes a first guiding rail fittingly connected to the first bracket, and the first guiding rail ensures that the first bracket drives the first roller to move linearly when the first drive member is rotated.

7. The automatic walking robot according to claim 1, wherein the first tensioning device and second tensioning device move in opposite directions when the first drive member and the second drive member are rotated in the same direction, and wherein the first tensioning device and second tensioning device move in the same direction when the first drive member and the second drive member are rotated in opposite directions.

8. The automatic walking robot according to claim 1, wherein the second tensioning device includes a second bracket threadedly connected to the second drive member and a second roller rotatably arranged on the second bracket, and the second roller is abutted against the drive belt.

9. The automatic walking robot according to claim 1, wherein the second mounting seat and the second roller are both located on a periphery of the drive belt and are respectively located on two sides of the plane.

10. The automatic walking robot according to claim 1, wherein the first roller and the second roller are both located on a periphery of the drive belt and are respectively located on two sides of the plane.

11. The automatic walking robot according to claim 1, wherein the bracket includes a left side wall, a right side wall opposite to the left side wall, and a bottom wall connecting the left side wall and the right side wall, the left side wall and the right side wall being located on the same side of the bottom wall, the second drive member being threadedly connected to the bottom wall, the second roller being located between the left side wall and the right side wall, and wherein the left side wall, the right side wall, the bottom wall, and the second roller define a closed cavity, and the drive belt penetrates through the closed cavity.

12. The automatic walking robot according to claim 1, wherein the housing includes a second guiding rail fittingly connected to the second bracket, and the second guiding rail ensures that the second bracket drives the second roller to move linearly when the second drive member is rotated.

13. A belt drive system comprising:
- a driving wheel, a driven wheel and a drive belt arranged on peripheries of the driving wheel and the driven wheel to transmit motion, the axial line of the driving wheel and the axial line of the driven wheel defining a plane, the drive belt including a first side portion located on one side of the plane and a second side portion located on an other side of the plane;
- a first drive belt tensioning mechanism acting on the first side portion and a second drive belt tensioning mechanism acting on the second side portion;
- the first drive belt tensioning mechanism including a first mounting seat, a first drive member threadedly connected to the first mounting seat, and a first tensioning device abutted against the first side portion, the first drive member being abutted against the first tensioning device, and when the first drive member is operated to rotate relative to the first mounting seat, the first drive member moves relative to the first mounting seat and along the axial direction of the first drive member to drive the first tensioning device to move relative to the housing; and
- the second drive belt tensioning mechanism including a second mounting seat, a second drive member in clearance fit with the second mounting seat, and a second tensioning device abutted against the second side portion, the second drive member being threadedly connected to the second tensioning device, and when the second drive member is operated to rotate relative to the second mounting seat, the second drive member rotates relative to the second tensioning device to drive the second tensioning device to move relative to the second mounting seat; and the first drive member and the second drive member are located on a same side of the plane.

* * * * *